United States Patent
Takahashi et al.

(10) Patent No.: US 9,599,300 B2
(45) Date of Patent: Mar. 21, 2017

(54) LIGHT EMITTING DEVICE AND LIGHTING DEVICE

(71) Applicant: Sharp Kabushiki Kaisha, Osaka-shi, Osaka (JP)

(72) Inventors: Koji Takahashi, Osaka (JP); Yoshiyuki Takahira, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 14/888,963

(22) PCT Filed: Feb. 24, 2014

(86) PCT No.: PCT/JP2014/054377
§ 371 (c)(1),
(2) Date: Nov. 4, 2015

(87) PCT Pub. No.: WO2014/192338
PCT Pub. Date: Dec. 4, 2014

(65) Prior Publication Data
US 2016/0116128 A1   Apr. 28, 2016

(30) Foreign Application Priority Data
May 29, 2013 (JP) .................................. 2013-113377

(51) Int. Cl.
| *F21S 8/10* | (2006.01) |
| *F21V 8/00* | (2006.01) |
| *F21V 9/16* | (2006.01) |
| *F21Y 101/00* | (2016.01) |

(52) U.S. Cl.
CPC ............ *F21S 48/1145* (2013.01); *F21K 9/64* (2016.08); *F21S 48/1241* (2013.01); *F21S 48/1258* (2013.01); *F21S 48/1323* (2013.01); *F21S 48/328* (2013.01); *F21V 9/16* (2013.01); *G02B 6/0006* (2013.01); *G02B 6/0008* (2013.01); *F21Y 2101/00* (2013.01); *F21Y 2115/30* (2016.08)

(58) Field of Classification Search
CPC ............... F21S 48/1145; F21S 48/1258; F21S 48/1323; F21S 48/328; F21S 48/1241; F21K 9/64; F21V 9/16; G02B 6/006; G02B 6/008
See application file for complete search history.

(56) References Cited

U.S. PATENT DOCUMENTS

| 2012/0188351 | A1* | 7/2012 | Kaku | .................... G06T 7/0016 348/65 |
| 2012/0197077 | A1* | 8/2012 | Kaku | ................. A61B 1/00009 600/109 |
| 2012/0314442 | A1 | 12/2012 | Takahashi et al. | |
| 2013/0182452 | A1 | 7/2013 | Takahira et al. | |

(Continued)

FOREIGN PATENT DOCUMENTS

| JP | 11-195303 A | 7/1999 |
| JP | 2010-232044 A | 10/2010 |

(Continued)

*Primary Examiner* — David V Bruce
(74) *Attorney, Agent, or Firm* — Keating & Bennett, LLP

(57) ABSTRACT

An optical guide member (104) includes an optical guide section having an exit end surface (Rx1) including a side a, and an imaging lens (105) forms, on a front surface of a light emitting section (101), an image of the side a in an image of excitation light (L1) on the exit end surface (Rx1).

5 Claims, 11 Drawing Sheets

(56) References Cited

U.S. PATENT DOCUMENTS

2013/0245411 A1\* 9/2013 Saito ................. A61B 1/00009
600/339
2014/0056021 A1 2/2014 Takahira et al.

FOREIGN PATENT DOCUMENTS

JP 2011-222260 A 11/2011
JP 2014-082057 A 5/2014

\* cited by examiner

LIGHT EMITTING DEVICE AND LIGHTING DEVICE

TECHNICAL FIELD

The present invention relates to a light emitting device and a lighting device.

BACKGROUND ART

Conventionally, a use of a white light source, which is obtained by exciting a phosphor by using excitation light of semiconductor laser or the like, as a light source for projection, which is included in a headlamp of a vehicle, has been proposed. As illustrated in FIG. 11, in accordance with a light distribution characteristic standard which is specified by laws, a headlamp of an automobile Car is required to be configured to form a light distribution pattern BP which has linear and sharp light-dark contrast CL in a front side of the automobile Car, for example, in a case where the headlamp is a lamp for passing. Such light-dark contrast is referred to as cutoff.

As one example of the headlamp, PTL 1 describes a lamp for a vehicle, which includes a light emitting section composed of an LED light source which forms a light distribution pattern for a lamp for passing and a phosphor for a laser light source which radiates fluorescence to a vicinity of a cutoff having the aforementioned light distribution pattern. By arranging a shade having the same shape as that of a cutoff line in close proximity to or immediately above a light-emitting surface of the phosphor, the lamp for a vehicle obtains a light distribution pattern having a shape prescribed with the light distribution characteristic standard for a headlamp.

CITATION LIST

Patent Literature

PTL 1: Japanese Unexamined Patent Application Publication No. 2010-232044 (published on Oct. 14, 2010)

SUMMARY OF INVENTION

Technical Problem

However, in the lamp for a vehicle described in PTL 1, an amount of light shielded by the shade is lost among all the amount of light output from the light-emitting surface of the phosphor. Accordingly, there is a problem that the aforementioned lamp for a vehicle is not preferable from a viewpoint of energy efficiency.

Furthermore, the aforementioned lamp for a vehicle irradiates the phosphor with laser light which has a Gaussian distribution. Therefore, radiation intensity of the laser light becomes uneven in a region irradiated with the laser light on a surface of the phosphor. As a result thereof, light-emitting intensity of the phosphor becomes uneven. There is a problem that this is not desirable from a viewpoint of controlling light emission from the phosphor to create a certain light distribution (light distribution pattern or light projection pattern).

The invention has been made in view of the aforementioned problems, and an object thereof is to provide a light emitting device and the like capable of obtaining a projection pattern which has a clear cutoff line without losing an amount of light from a light emitting section due to a shielding object such as a shade.

Solution to Problem

In order to solve the aforementioned problems, a light emitting device according to one aspect of the invention includes: an excitation light source which outputs excitation light; a light emitting section which emits light by receiving the excitation light; an optical guide member which guides the excitation light from the excitation light source to the light emitting section; and an optical member which forms, on a front surface of the light emitting section, an image of the excitation light guided by the optical guide member, in which the excitation light is radiated to the front surface obliquely, the optical guide member includes an optical guide section which has an exit end surface including at least one side, and the optical member forms an image of a linear edge portion, which corresponds to one of the at least one side, in the image of the excitation light.

Advantageous Effects of Invention

According to one aspect of the invention, an effect of being able to obtain a projection pattern which has a clear cutoff line without losing an amount of light from a light emitting section due to a shielding object such as a shade is realized.

DESCRIPTION OF EMBODIMENTS

[Embodiment 1]

Figure 1:
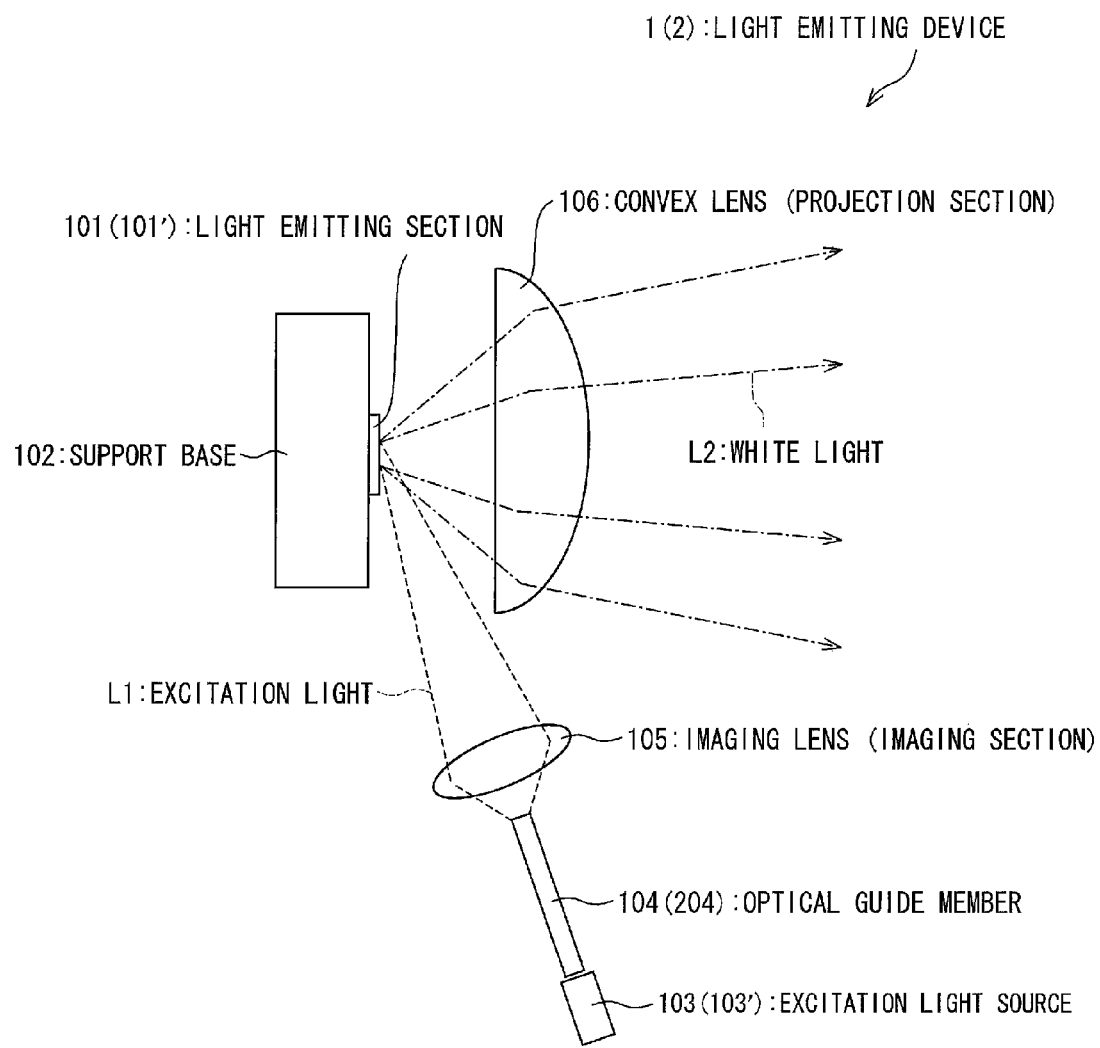
FIG. 1 is a diagram illustrating a configuration of a light emitting device according to one embodiment of the invention.

One embodiment of the invention will be described in detail below by using FIG. 1 to FIG. 2.

(Configuration of Light Emitting Device 1)

First, a configuration of a light emitting device (lighting device) 1 according to the present embodiment will be described by using FIG. 1. FIG. 1 is a diagram illustrating the configuration of the light emitting device 1. As illustrated in FIG. 1, the light emitting device 1 includes a light emitting section 101, a support base 102, an excitation light source 103, an optical guide member 104, an imaging lens (optical member) 105, and a convex lens (projection section) 106. The light emitting device 1 irradiates the light emitting section 101 with excitation light L1 output by the excitation light source 103, and projects resulting white light L2 to an outside of the light emitting device 1. Note that, in respective figures referred to below, an x axis direction corresponds to a horizontal direction. Moreover, a y axis and a z axis are orthogonal axes each of which forms a surface perpendicular to the x axis direction.

The light emitting section 101 has a configuration in which three types of phosphors emitting fluorescence of each color of RGB are dispersed within glass. When the excitation light L1 enters the light emitting section 101, fluorescence of three colors of RGB is emitted from the three types of phosphors. These pieces of fluorescence mix with each other, and the white light L2 is thereby obtained. Note that, the three types of phosphors may be, for example, red (R): $CaAlSiN_3$: Eu, green (G): $\beta$-SiAiON: Eu, and blue (B): $(BaSr)MgAl_{10}O_{17}$: Eu.

The support base 102 supports the light emitting section 101 by causing, on a surface thereof, a rear surface of the light emitting section 101 to be bonded. The support base 102 is preferably formed of a material which reflects, with high reflectance, the white light L2, more specifically, each fluorescence of RGB constituting the white light L2, which is output from the light emitting section 101. It is preferable that the support base 102 be formed of metal such as aluminum. With the aforementioned configuration, the support base 102 is able to reflect the white light L2 which is output from a rear surface side of the light emitting section 101 to the convex lens 106 side, the rear surface side being a side where the light emitting section 101 and the support base 102 are in contact with each other. Note that, the support base 102 may be formed of a material such as a high thermal conductivity ceramics which is not metal. In the case of this configuration, heat generated in the light emitting section 101 by the energy of excitation light L1 is able to be released through the support base 102.

The excitation light source 103 is a semiconductor laser element which outputs the excitation light L1 exciting the three types of phosphors included in the light emitting section 101. Specifically, the excitation light source 103 outputs laser light which has a wavelength of 405 nm and an output of 3 W. The excitation light source 103 is attached to a heat sink for heat radiation (not illustrated) and connected to a power circuit for driving (not illustrated). An exit end surface of the excitation light source 103 is butt-joined to an entrance end surface of the optical guide member 104.

The optical guide member 104 guides the excitation light L1 received from the excitation light source 103 toward a direction of a front surface of the light emitting section 101. More specifically, the optical guide member 104 guides the excitation light L1 received from the excitation light source 103 so that the excitation light L1 obliquely enters the front surface of the light emitting section 101. The optical guide member 104 is a rod lens made of resin.

The imaging lens 105 is a convex lens arranged between the optical guide member 104 and the light emitting section 101. The imaging lens 105 defines an image formation surface of a near field image of the excitation light L1, which is generated on an exit end surface 104a of the optical guide member 104. The imaging lens 105 is formed of, for example, glass. The passed excitation light L1 which has passed through the imaging lens 105 enters the front surface of the light emitting section 101.

(Details of Optical Guide Member 104)

A perspective view of the optical guide member 104 is illustrated in FIG. 2(a). In addition, a top view of the light emitting section 101 is illustrated in FIG. 2(b).

As illustrated in FIG. 2(a), the optical guide member 104 has a cross section perpendicular to a direction in which the excitation light L1 is guided, the cross section having a rectangular shape with a side a, a side b, a side c, and a side d. The length of each of the side a, the side b, the side c, and the side d may be 1 mm. The excitation light L1 passes through the optical guide member 104 and is then output from the exit end surface 104a of the optical guide member 104. The length of the optical guide member 104 is, for example, about 10 mm to about 20 mm. It is preferable that a diameter and the length of the optical guide member 104 be defined so that a light intensity distribution of the excitation light L1 in the exit end surface is approximately uniform (top hat type). The excitation light L1 passes through the optical guide member 104 while repeating reflection on an inner surface of the optical guide member 104, and thereby has almost uniform energy intensity on the exit end surface 104a. Here, an image of the excitation light L1, which is generated on the exit end surface 104a is referred to as a near field image on the exit end surface 104a. The near field image has a shape corresponding to a shape of the exit end surface 104a, that is, the rectangular shape formed of four sides of the side a, the side b, the side c, and the side d.

In FIG. 2(b), an irradiation region Rx1 indicates a region on the front surface of the light emitting section 101, which is irradiated with the excitation light L1. The irradiation region Rx1 is a region having a rectangular shape formed of four sides of a side a', a side b', a side c', and a side d' which correspond to the four sides of the side a, the side b, the side c, and the side d of the exit end surface 104a (and the near field mage), respectively. The imaging lens 105 forms, on the front surface of the light emitting section 101, an image of the side a (edge portion) of the near field image as the side a' (image formation region). As a result thereof, by forming the image of the near field image, the light emitting section 101 emits light with high light-dark contrast between an inside and an outside of the irradiation region Rx1 with the side a' of the irradiation region Rx1 as a boundary.

Figure 11:
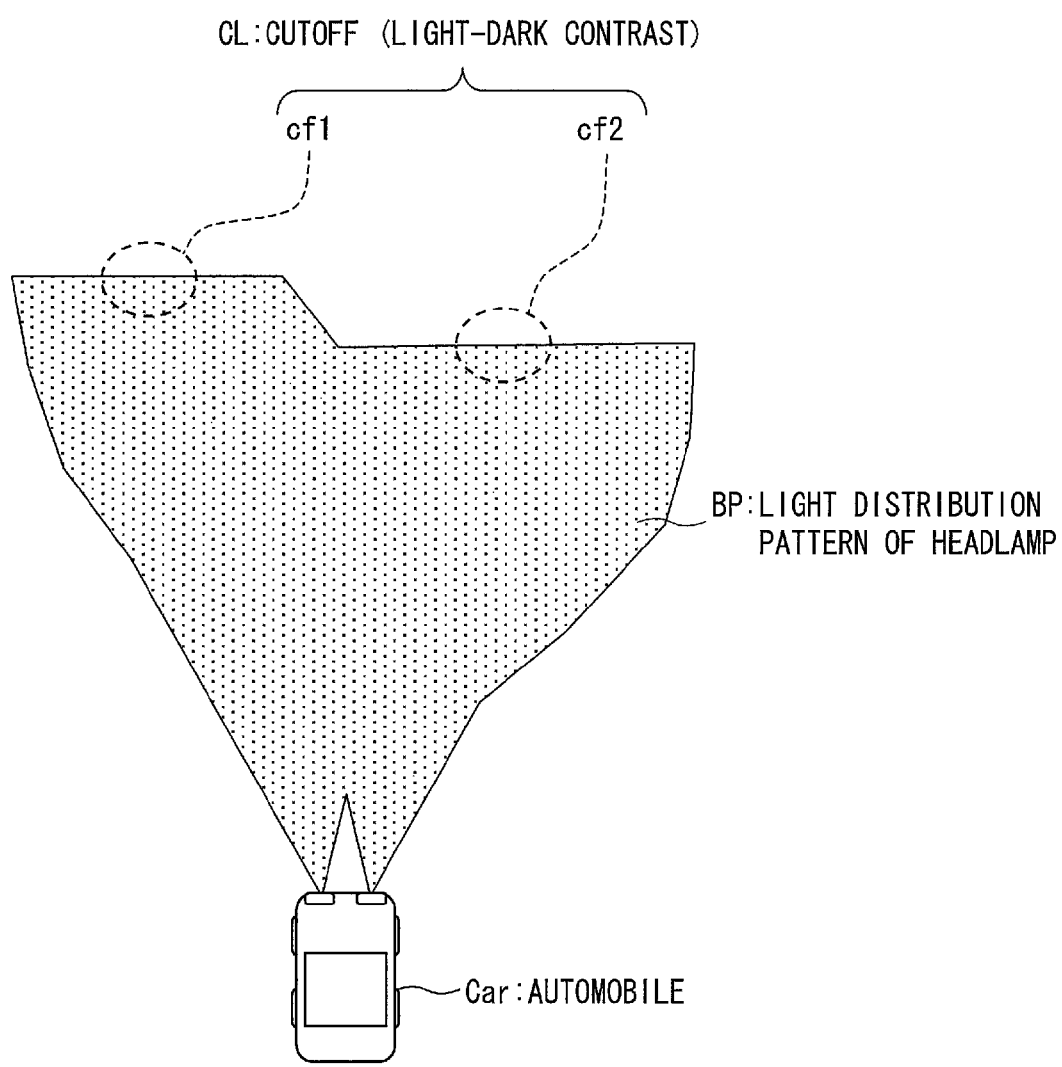
FIG. 11 is a view illustrating a light distribution pattern by a headlamp of an automobile.

The white light L2 output from the light emitting section 101 is projected to an outside of the light emitting device 1 by the convex lens 106 made of resin. Here, the side a' which defines the boundary of the light-dark contrast is set in the x axis direction, that is, the horizontal direction. Therefore, when the light emitting device 1 is used as a light source of the headlamp of the automobile Car illustrated in FIG. 11, the white light L2 which is projected to the outside of the light emitting device 1 has a high light-dark contrast orthogonally to a radiation direction of the headlamp. The high light-dark contrast of the white light L2, which is obtained in this manner, is able to form a cutoff line cf1 or cf2 in the light distribution pattern BP of the headlamp, which is illustrated in FIG. 11.

(Supplement; Image Formation of Near Field Image in Irradiation Region Rx1)

A surface where an image of the near field image is formed is orthogonal to an entering direction of the excitation light L1. Moreover, since the excitation light L1 enters the front surface of the light emitting section 101 obliquely, the surface where an image of the near field image of the excitation light L1 is formed, which is defined by the imaging lens 105, is not parallel to the front surface of the light emitting section 101. Accordingly, the imaging lens 105 is able to form an image in which only the side a and the side c orthogonal to the direction of the excitation light L1 entering the light emitting section 101, on the front surface of the light emitting section 101 most sharply among the side a, the side b, the side c, and the side d. However, in a case where an image of the side a is formed on the front surface of the light emitting section 101, the surface where an image of the near field image is formed and the front surface of the light emitting section 101 cross at the side a', so that an image of a region (including the side b, the side c, and the side d) of the near field image other than the side a is not formed as sharply as the side a on the front surface of the light emitting section 101.

Thus, in the irradiation region Rx1, the excitation light L1 in a region other than the side a' is not as distinct as the excitation light L1 in the side a'. In other words, light-dark contrast of the excitation light L1, which has the side b', the side c', and the side d' as boundaries, is low as compared to light-dark contrast of the excitation light L1, which has the side a' as a boundary. Accordingly, the light emitting section 101 is able to create the highest light-dark contrast which has the side a' as a linear boundary.

(Modified Example)

With the above-described configuration, the white light L2 is able to be obtained by mixing fluorescence from the three types of phosphors. However, the configuration for obtaining the white light L2 is not limited to the above-described configuration. In one modified example, a light emitting section 101' has a configuration in which YAG: Ce phosphor which emits yellow fluorescence by receiving the excitation light L1 is sintered, and a semiconductor laser element (excitation light source section) 103a' may be configured to output the excitation light L1 having a wavelength of 450 nm (blue). With the aforementioned configuration, the yellow fluorescence emitted from the light emitting section 101' and the blue excitation light L1 reflected on a front surface of the light emitting section 101' mix, so that the white light L2 is able to be obtained. Note that, in the configuration of the present modified example, the semiconductor laser element 103a' needs to have an output which meets an amount of energy of the excitation light L1 converted into the fluorescence in the light emitting section 101' and an amount of energy of the excitation light L1 constituting the white light L2.

[Embodiment 2]

Figure 3:
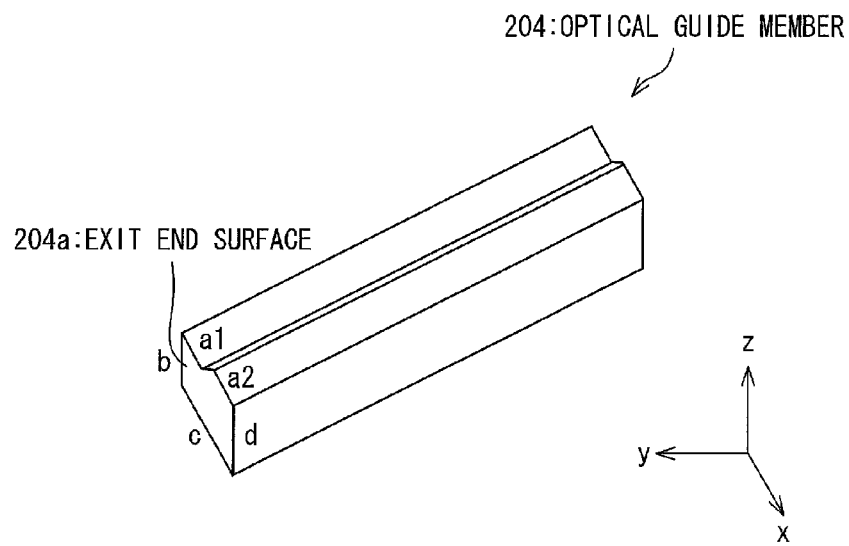
FIG. 3(a) is a perspective view of another optical guide member of the light emitting device illustrated in FIG. 1.
FIG. 3(b) is a top view of the light emitting section, which illustrates an irradiation region of the excitation light.
Figure 3:
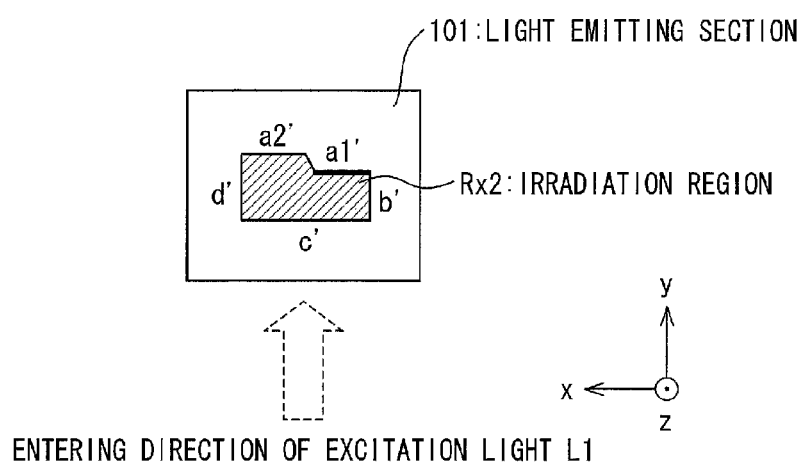

Another embodiment of the invention will be described based on FIG. 3 as follows. Note that, for convenience of description, the same reference signs are assigned to members having the same functions as those of the members described in the aforementioned embodiment, and description thereof will be omitted.

(Feature of Light Emitting Device 2)

In the aforementioned embodiment, the example in which the optical guide member 104 has the exit end surface 104a in the rectangular shape has been described. However, the shape of the exit end surface of the optical guide member is not limited thereto, and only needs to be a shape including at least one side.

Figure 2:
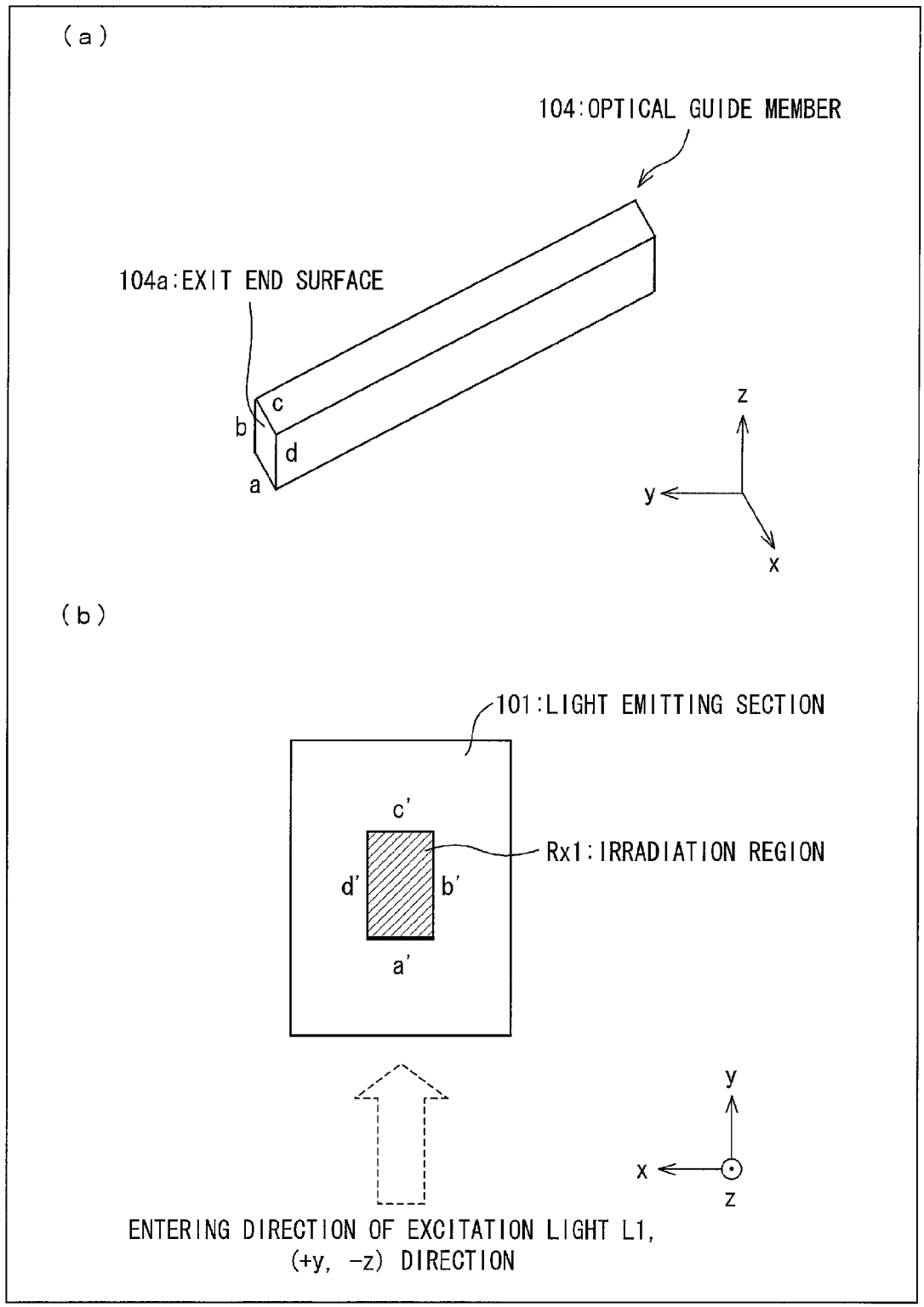
FIG. 2(a) is a perspective view of an optical guide member of the light emitting device illustrated in FIG. 1.
FIG. 2(b) is a top view of a light emitting section, which illustrates an irradiation region of excitation light.

A light emitting device 2 according to the present embodiment includes an optical guide member 204 instead of the optical guide member 104, in the configuration of the light emitting device 1 of the aforementioned embodiment illustrated in FIG. 1. Other configuration of the light emitting device 2 is the same as the configuration of the light emitting device 1.

(Details of Optical Guide Member 204)

A perspective view of the optical guide member 204 is illustrated in FIG. 3(a). In addition, a top view of the light emitting section 101 is illustrated in FIG. 3(b).

As illustrated in FIG. 3(a), the optical guide member 204 has a polygonal exit end surface 204a which has a side a1, a side a2, a side b, a side c, and a side d. The exit end surface 204a has a shape corresponding to the light distribution pattern BP of the headlamp, which is illustrated in FIG. 11. As illustrated in FIG. 3(b), the excitation light L1 output from the exit end surface 204a is radiated to an irradiation region Rx2 on the front surface of the light emitting section 101. Here, the imaging lens 105 is able to form an image with only any one of the side a1, the side a2, and the side c of a near field image which is generated on the exit end surface 204a to be sharp, on the front surface of the light emitting section 101. The side a2, the side a1, the side b, the side c, and the side d of the exit end surface 204a correspond to a side a2', a side a1', a side b', a side c', and a side d' of the irradiation region Rx2 of the light emitting section 101 in this order. The white light L2 output from the side a1' and the side a2' of the irradiation region Rx2 forms the cutoff lines cf2 and cf1 of the light distribution pattern BP illustrated in FIG. 11. Particularly, in a case where the light emitting device 1 is used as a lamp for passing of a vehicle, it is preferable that projection be performed so that the side a1' serves as a boundary of the highest light-dark contrast.

[Embodiment 3]

Another embodiment of the invention will be described based on FIG. 4 to FIG. 5 as follows. Note that, for convenience of description, the same reference signs are assigned to members having the same functions as those of the members described in the aforementioned embodiments, and description thereof will be omitted.

(Feature of Light Emitting Device 3)

A first feature of a light emitting device 3 of the present embodiment with respect to the light emitting device 1 of the aforementioned embodiment is that an excitation light source 303 is composed of a plurality of semiconductor laser elements 303a and composed to irradiate the light emitting section 101 with the excitation light L1 output from the plurality of semiconductor laser elements 303a.

(Configuration of Light Emitting Device 3)

Here, a configuration of the light emitting device 3 according to the present embodiment will be described by using FIG. 4. FIG. 4 is a configuration diagram of the light emitting device 3. As illustrated in FIG. 4, the light emitting device 3 includes the light emitting section 101, a support base 302, the excitation light source 303, an optical guide member 304, the imaging lens 105, and a projection section 306.

Figure 4:
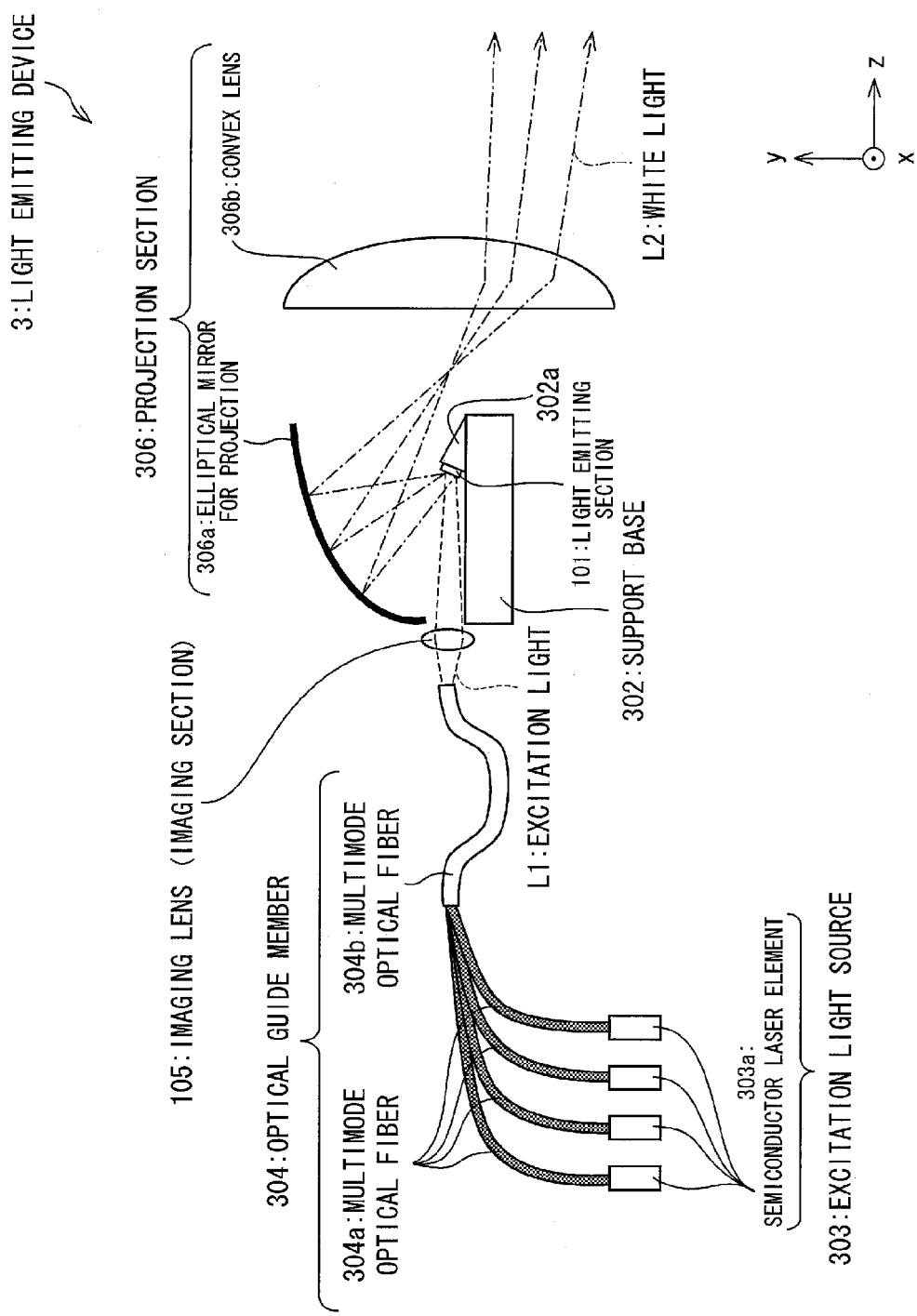
FIG. 4 is a diagram illustrating a configuration of a light emitting device according to another embodiment of the invention.
Figure 5:
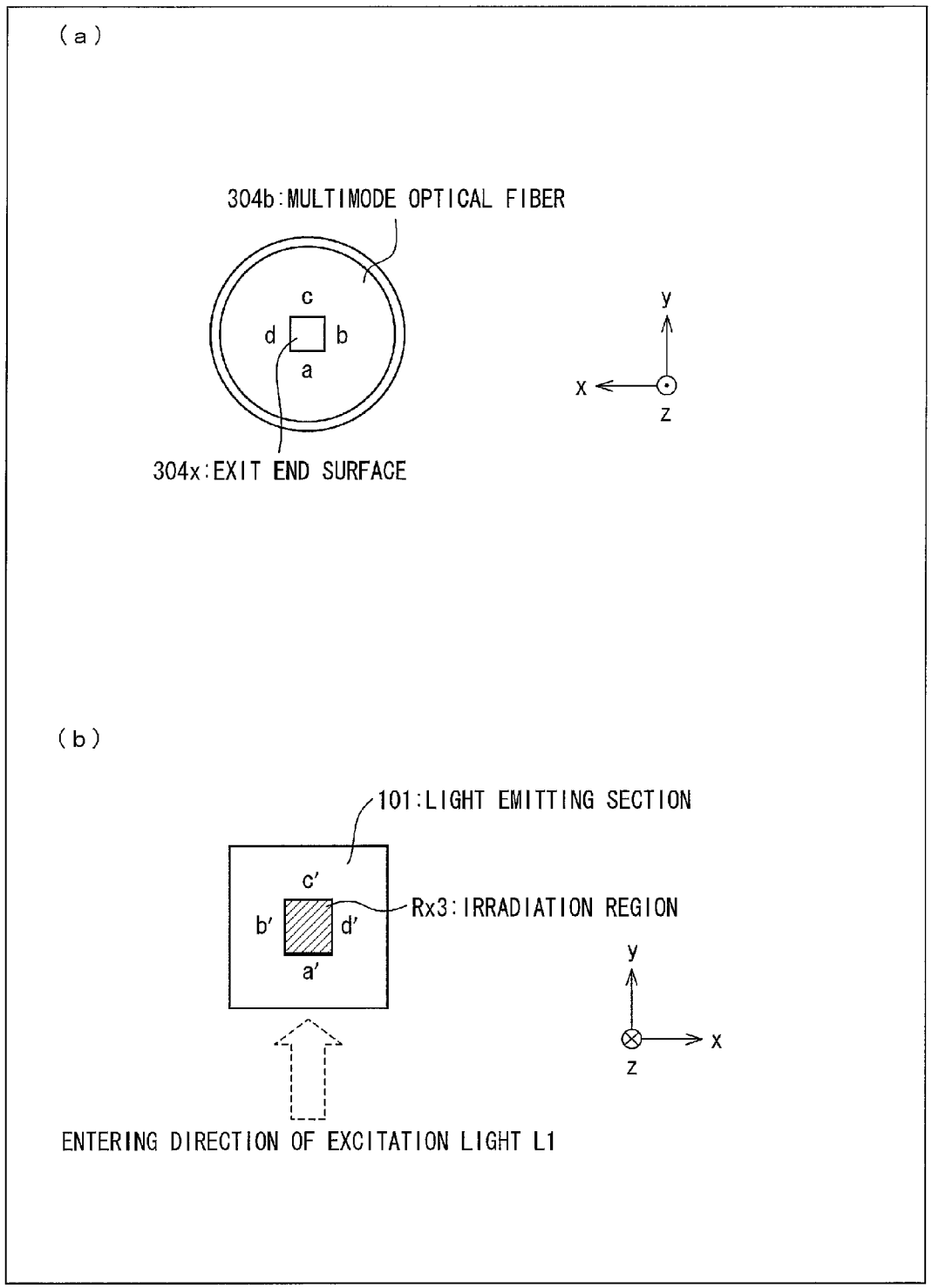
FIG. 5(a) is a view of an optical fiber of the light emitting device illustrated in FIG. 4, which is viewed from an exit end surface side.
FIG. 5(b) is a top view of the light emitting section, which illustrates an irradiation region of the excitation light.

As illustrated in FIG. 4, the support base 302 has, on a surface thereof, a support section 302a which has a flat surface inclined from an x-y plane in a +z direction by 15 degrees. The light emitting section 101 is bonded to the flat surface of the support section 302a to thereby be fixed. The support base 302 is desired to be formed of metal having high reflectance with respect to the white light L2. The support base 302 may be formed of, for example, aluminum. Alternatively, the support base 302 may not be formed of metal but high thermal conductivity ceramics.

The excitation light source 303 is composed of four semiconductor laser elements 303a. Each of the semiconductor laser elements 303a outputs the excitation light L1 having a wavelength of 405 nm and an output of 1 W.

The optical guide member 304 includes four multimode optical fibers 304a (hereinafter, referred to as optical fibers 304a) and one multimode optical fiber 304b (hereinafter, referred to as an optical fiber 305b).

Entrance end surfaces of the four optical fibers 304a respectively receive the excitation light L1 output from the semiconductor laser elements 303a. Moreover, exit end surfaces of the four optical fibers 304a are set into one bundle and jointed to an entrance end surface 304b of the optical fiber 304b. Therefore, the excitation light L1 which has passed through each of the optical fibers 304a enters the optical fiber 304b directly.

The optical fiber 304b outputs the excitation light L1 from a −z direction toward the light emitting section 101 on the support section 302a. The excitation light L1 enters the front surface of the light emitting section 101 through the imaging lens 105 with an incident angle of 15 degrees. Note that, it is preferable that the optical fiber 304b be a multimode optical fiber of a step index type (SI type) in which a refractive index at a core is constant. In addition, it is preferable that a light intensity distribution of the excitation light L1 in an exit end surface of the optical fiber 304b be approximately uniform (top hat type). The excitation light L1 output from the optical fiber 304b enters the light emitting section 101 through the imaging lens 105.

With the configuration of the optical guide member 304, the excitation light L1 of 4 W, which is a sum of outputs of 1 W respectively obtained from the four semiconductor laser elements 303a, is output from the optical fiber 304b. Therefore, even when the output of the excitation light L1 from one semiconductor laser element 303a is low, it is possible to irradiate the light emitting section 101 with the excitation light L1 of a high output.

The projection section 306 projects the white light L2 output from the light emitting section 101 to an outside of the light emitting device 3. The projection section 306 includes an elliptical mirror 306a and a convex lens 306b. The elliptical mirror 306a causes the white light L2 emitted from the light emitting section 101 to be reflected and directed toward the convex lens 306b. The white light L2 is projected to the outside of the light emitting device 3 by the convex lens 306b.

(Details of Optical Guide Member 304)

Next, the optical guide member 304 will be described in detail by using FIGS. 5(a) and (b). FIG. 5(a) is a view illustrating an exit end surface 304x of the optical fiber 304b of the optical guide member 304. FIG. 5(b) is a top view of the light emitting section 101, which is a view illustrating an irradiation region Rx3 of the excitation light L1.

As illustrated in FIG. 5(a), the optical fiber 304b of the optical guide member 304 has a rectangular core (including the exit end surface 304x) formed of a side a, a side b, a side c, and a side d. The excitation light L1 passes through the optical fiber 304b and is then output from the exit end surface 304x of the optical fiber 304b. While passing through the optical fiber 304b, the excitation light L1 repeats reflection on an inner surface of the optical fiber 304b, and thereby has uniform energy intensity on the exit end surface 304x. Note that, the optical fiber 304b may have a core in a polygonal shape instead of the rectangular core, or may have a core in a shape corresponding to a light distribution pattern of a low beam as the optical guide member 204 of the aforementioned embodiment.

As illustrated in FIG. 5(b), the excitation light L1 output from the exit end surface 304x is radiated to the irradiation region Rx3 of the light emitting section 101. The irradiation region Rx3 has a rectangular shape composed of four sides of a side a', a side b', a side c', and a side d' corresponding to the side a, the side b, the side c, and the side d of the exit end surface 304x, respectively. Here, the imaging lens 105 forms an image of the side a of a near field image, which is generated on the exit end surface 304x, on the front surface of the light emitting section 101 as the side a'. Thereby, a sharp linear boundary of light-dark contrast is formed by imaging the side a of the near field image at the side a' of the irradiation region Rx3 on the front surface of the light emitting section 101. As a result thereof, in a projection pattern projected by the projection section 306, the linear boundary of light-dark contrast is formed in the horizontal direction at a part of the projection pattern corresponding to the side a' of the light emitting section 101. Thus, by using the light emitting device 3, it is realized to obtain projection particularly suitable for being used as a headlamp for passing.

[Embodiment 4]

Figure 6:
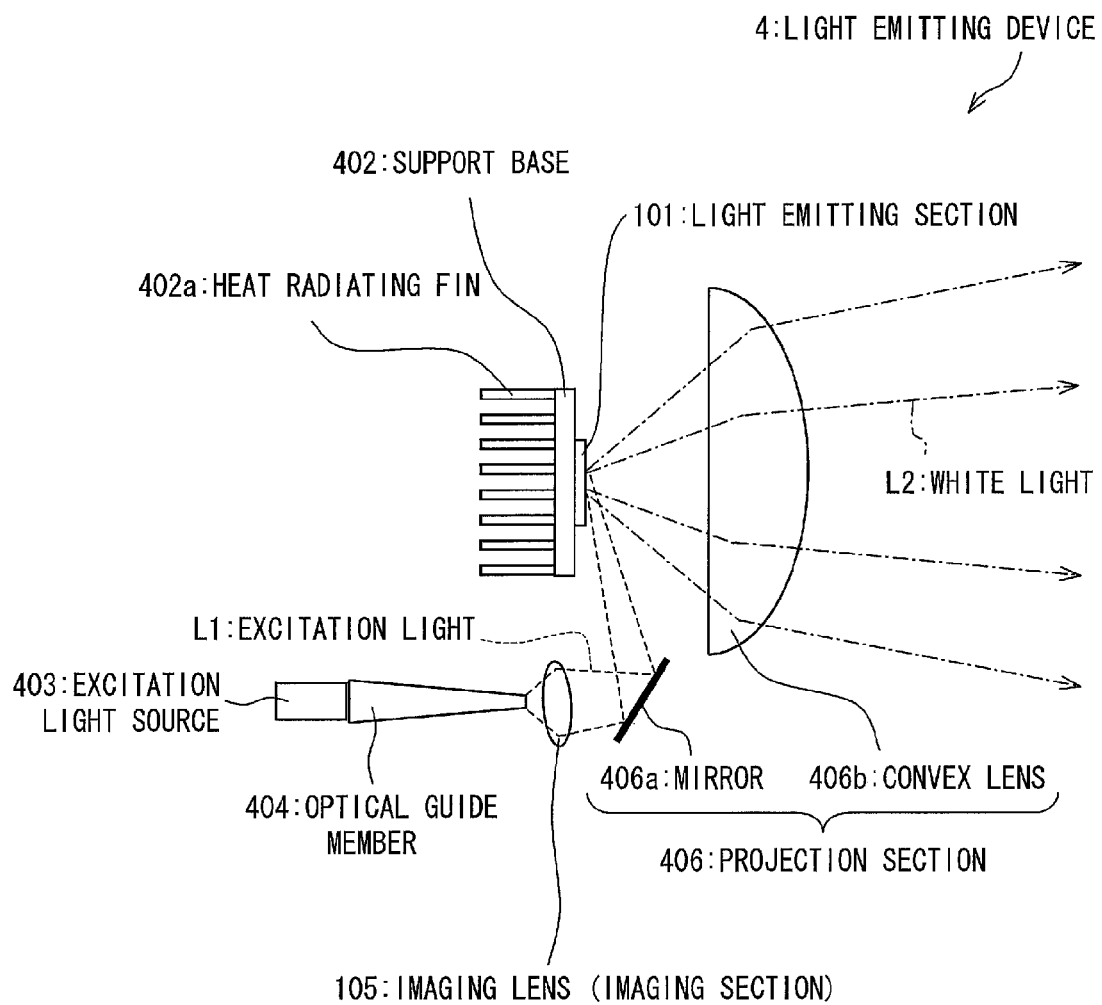
FIG. 6 is a diagram illustrating a configuration of a light emitting device according to still another embodiment of the invention.
Figure 7:
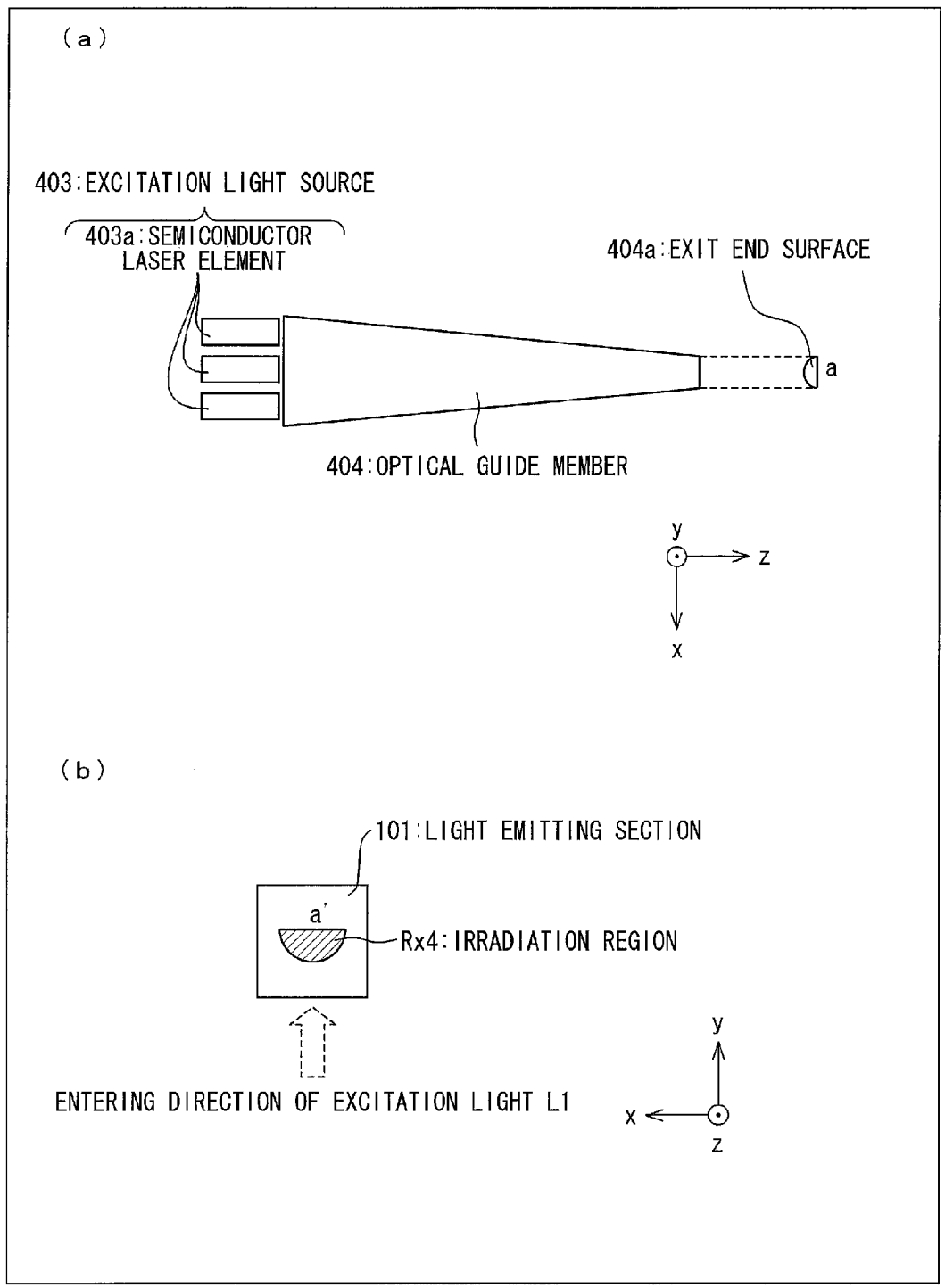
FIG. 7(a) is a side view of an excitation light source and an optical guide member of the light emitting device illustrated in FIG. 6.
FIG. 7(b) is a top view of the light emitting section, which illustrates an irradiation region of the excitation light.

Another embodiment of the invention will be described based on FIG. 6 to FIG. 7 as follows. Note that, for convenience of description, the same reference signs are assigned to members having the same functions as those of the members described in the aforementioned embodiments, and description thereof will be omitted.

(Feature of Light Emitting Device 4 According to Present Embodiment)

A first feature of a light emitting device 4 of the present embodiment compared to the light emitting devices 1 to 3 of the aforementioned embodiments is that an optical guide member 404 is a tapered type. Here, the tapered type means that an area of an entrance end surface is larger than an area of an exit end surface.

(Configuration of Light Emitting Device 4)

A configuration of the light emitting device 4 according to the present embodiment will be described by using FIG. 6. FIG. 6 is a configuration diagram of the light emitting device 4. As illustrated in FIG. 6, the light emitting device 4 includes the light emitting section 101, a support base 402, an excitation light source 403, the optical guide member 404, the imaging lens 105, and a projection section 406.

The support base 402 is different from the support base 102 of the aforementioned embodiment in that a heat radiating fin 402a is provided on a rear surface which is a surface opposite to a front surface on which the light emitting section 101 is mounted. The heat radiating fin 402a suppresses an increase in temperature of the light emitting section 101, which results from being irradiated with the excitation light L1. The heat radiating fin 402a is formed of a material having high thermal conductivity (for example, metal).

The excitation light source 403 is composed of a semiconductor laser element 403a which outputs the excitation light L1 having a wavelength of 405 nm and an output of 1.5 W.

The optical guide member 404 is a rod lens of a tapered type and formed of, for example, glass. Exit openings of three semiconductor laser elements are butt-joined to an entrance end surface of the optical guide member 404. Thereby, the optical guide member 404 receives the excitation light L1 of 1.5 W, which is output from the three semiconductor laser elements 403a, from the entrance end surface. Accordingly, the excitation light L1 having an output of 4.5 W is to be output from the optical guide member 404.

The projection section 406 includes a mirror 406a and a convex lens 406b. The mirror 406a causes the excitation light L1 output from the optical guide member 404 to be reflected and directed toward the light emitting section 101. Moreover, the mirror 406a causes the excitation light L1 to enter the front surface of the light emitting section 101 from an oblique direction. The white light L2 which has passed through the convex lens 406b is projected to an outside of the light emitting device 4.

(Details of Excitation Light Source 403 and Optical Guide Member 404)

Next, the excitation light source 403 and the optical guide member 404 will be described in detail by using FIGS. 7(a) and (b). FIG. 7(a) is a side view of the excitation light source 403 and the optical guide member 404 of the light emitting device 4, and FIG. 7(b) is a top view of the light emitting section 101, which is a view illustrating an irradiation region Rx4 of the excitation light L1.

As illustrated in FIG. 7(a), the excitation light source 403 includes the three semiconductor laser elements 403a. Moreover, the optical guide member 404 has an exit end surface 404a in a half moon shape having a side a. Here, the side a extends in the x axis direction. While passing through the optical guide member 404, the excitation light L1 repeats reflection on an inner surface of the optical guide member 404, and thereby has uniform energy intensity on the exit end surface 404a.

As illustrated in FIG. 7(b), the excitation light L1 output from the exit end surface 404a of the optical guide member 404 is radiated to the irradiation region Rx4 of the light emitting section 101. The irradiation region Rx4 has a half moon shape having a side a', which corresponds to the shape of the exit end surface 404a. The imaging lens 105 forms an image of the side a of a near field image, which is generated on the exit end surface 404a, on the front surface of the light emitting section 101 as the side a'. Thereby, on the front surface of the light emitting section 101, the side a' of the irradiation region Rx4 receives the excitation light L1 having a sharp linear boundary of light-dark contrast by forming the image of the side a of the near field image. As a result thereof, in a projection pattern projected by the projection section 406, the linear boundary of light-dark contrast is formed in the horizontal direction at a part of the projection pattern corresponding to the side a' of the light emitting section 101. Thus, by using the light emitting device 4, it is realized to obtain projection particularly suitable for being used as a headlamp for passing.

[Embodiment 5]

Figure 8:
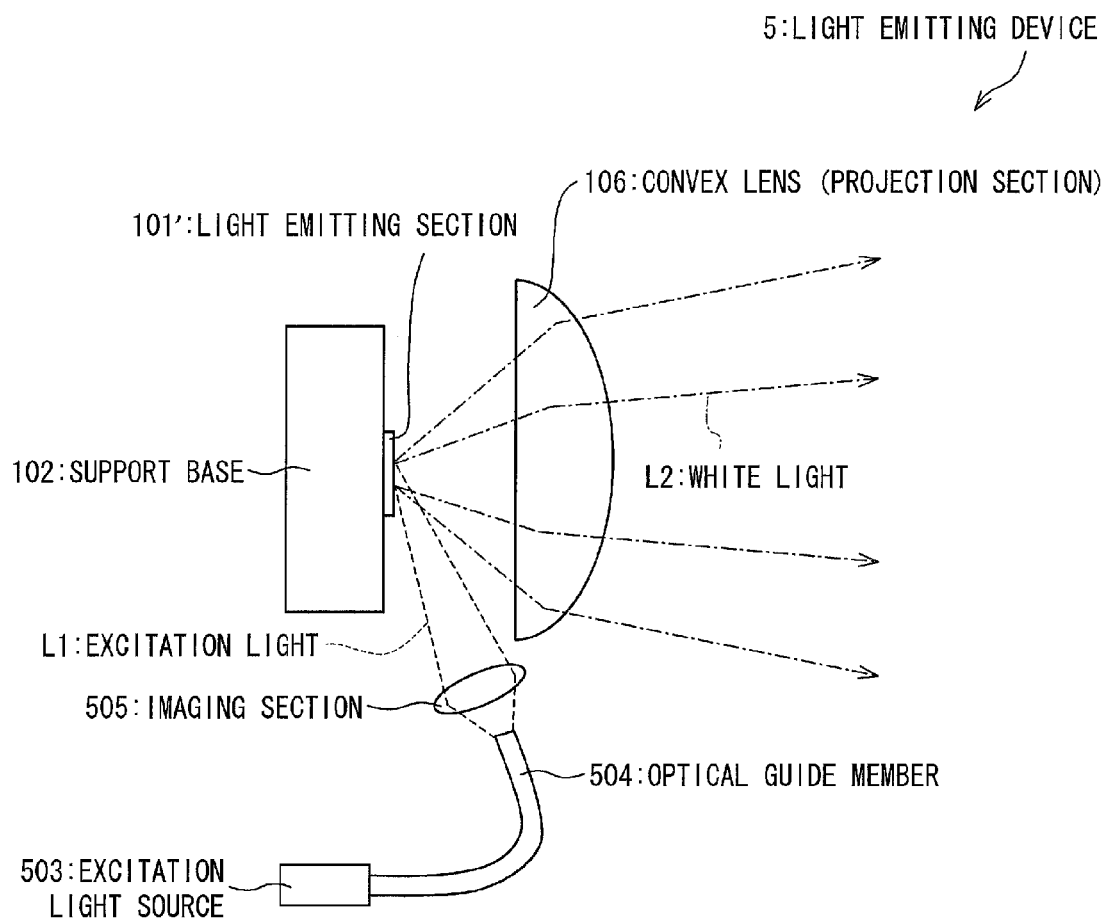
FIG. 8 is a diagram illustrating a configuration of a light emitting device according to still another embodiment of the invention.
Figure 9:
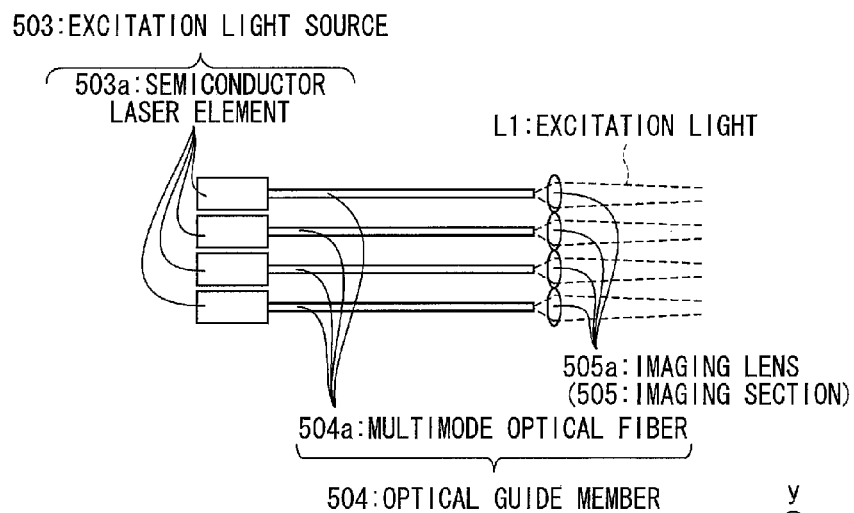
FIG. 9(a) is a side view of an excitation light source, an optical guide member, and an imaging section of the light emitting device illustrated in FIG. 8.
FIG. 9(b) is a top view of a light emitting section, which illustrates an irradiation region of the excitation light.
Figure 9:
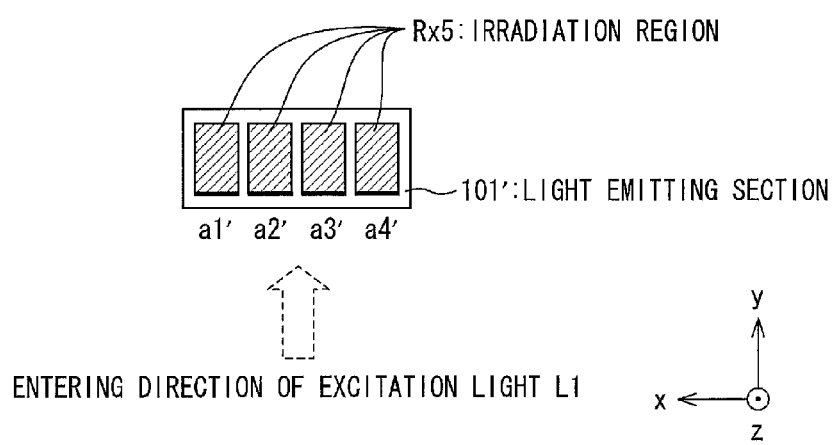

Another embodiment of the invention will be described based on FIG. 8 to FIG. 9 as follows. Note that, for convenience of description, the same reference signs are assigned to members having the same functions as those of the members described in the aforementioned embodiments, and description thereof will be omitted.

(Feature of Light Emitting Device 5 According to Present Embodiment)

A first feature of a light emitting device 6 of the present embodiment compared to the light emitting devices 1 to 4 of the aforementioned embodiments is that an irradiation region Rx5 (refer to FIG. 9(b)) is composed of a plurality of divided regions which are irradiated with the excitation light L1 from a plurality of semiconductor laser elements 503a (refer to FIG. 9(a)).

(Configuration of Light Emitting Device 5)

Here, a configuration of the light emitting device 5 according to the present embodiment will be described by using FIG. 8. FIG. 8 is a configuration diagram of the light emitting device 5. As illustrated in FIG. 8, the light emitting device 5 includes the light emitting section 101, the support base 102, an excitation light source 503, an optical guide member 504, an imaging section (optical member) 505, and the convex lens 106.

The excitation light source 503 is composed of semiconductor laser elements 503a which output the excitation light L1 having a wavelength of 450 nm and an output of 0.5 W.

The optical guide member 504 is composed of multimode optical fibers 504a (hereinafter, referred to as optical fibers 504a). The optical guide member 504 outputs the excitation light L1 toward the front surface of the light emitting section 101'.

The imaging section 505 is composed of imaging lenses 505a. The imaging lenses 505a are convex lenses and formed of, for example, glass. The imaging section 505 is arranged between the optical guide member 504 and the light emitting section 101'.

When the light emitting section 101' receives the excitation light L1 output from the optical guide member 504, the white light L2 is output from the light emitting section 101'. The white light L2 output from the light emitting section 101 passes through the convex lens 106 and is then projected to an outside of the light emitting device 1.

(Details of Excitation Light Source 503, Optical Guide Member 504, and Imaging Section 505)

Next, configurations of the excitation light source 503, the optical guide member 504, and the imaging section 505 will be described in detail by using FIGS. 9(a) and (b). FIG. 9(a) is a side view of the excitation light source 503, the optical guide member 504, and the imaging section 505 of the light emitting device 5. In addition, FIG. 9(b) is a top view of the light emitting section 101', which is a view illustrating the irradiation region Rx5 of the excitation light L1.

As illustrated in FIG. 9(a), the excitation light source 503 includes four semiconductor laser elements 503a. The optical guide member 504 includes four optical fibers 504a. The imaging section 505 includes four imaging lenses 505a.

Each excitation light L1 output from the four semiconductor laser elements 503a enters each of entrance end surfaces of the optical fibers 504a which are mutually different. The four bundles of the excitation light L1, which have passed through the four optical fibers 504a to be output from exit end surfaces of the optical fibers 504a, respectively enter the light emitting section 101' through the imaging lenses 505a which are mutually different. Here, each of the exit end surfaces of the four optical fibers 504a is in a rectangular shape having a side a1, a side a2, a side a3, and a side a4 (not illustrated). Therefore, on the exit end surface of each of the optical fibers 504a, four rectangular near field images which have the side a1, the side a2, the side a3, or the side a4 are generated.

As illustrated in FIG. 9(b), the four bundles of the excitation light L1 output from the four optical fibers 504a are radiated to the irradiation region Rx5 composed of four divided regions on the front surface of the light emitting section 101', which are separated from each other. The imaging lens 505a forms images of the side a1 to the side a4 of the four near field images of the excitation light L1 on the front surface of the light emitting section 101' as the side a1' to the side a4' of the four divided regions which constitute the irradiation region Rx5. In a projection pattern projected by the lens 106 serving as the projection section, a linear boundary of light-dark contrast is formed in the horizontal direction at a part of the projection pattern corresponding to the side a1' to the side a4' of the light emitting section 101'. Thus, by using the light emitting device 5, it is realized to obtain projection particularly suitable for being used as a headlamp for passing.

Here, each of the divided regions is irradiated with the excitation light L1 which is output from a corresponding one of semiconductor laser elements 503a which are independent of each other. Thus, it is possible that a region or regions among the four divided regions are caused to emit light or to turn the light off by selecting energization or non-energization of each of the semiconductor laser elements 503a. Accordingly, in a case where the light emitting device 6 is used for a headlamp of an automobile, it is possible to obtain a light distribution pattern in accordance with a road condition and a traveling condition of a vehicle and/or a light distribution pattern in accordance with an obstacle and a traffic sign by independently controlling light emission and turning-off of the four divided regions.

[Embodiment 6]

Figure 10:
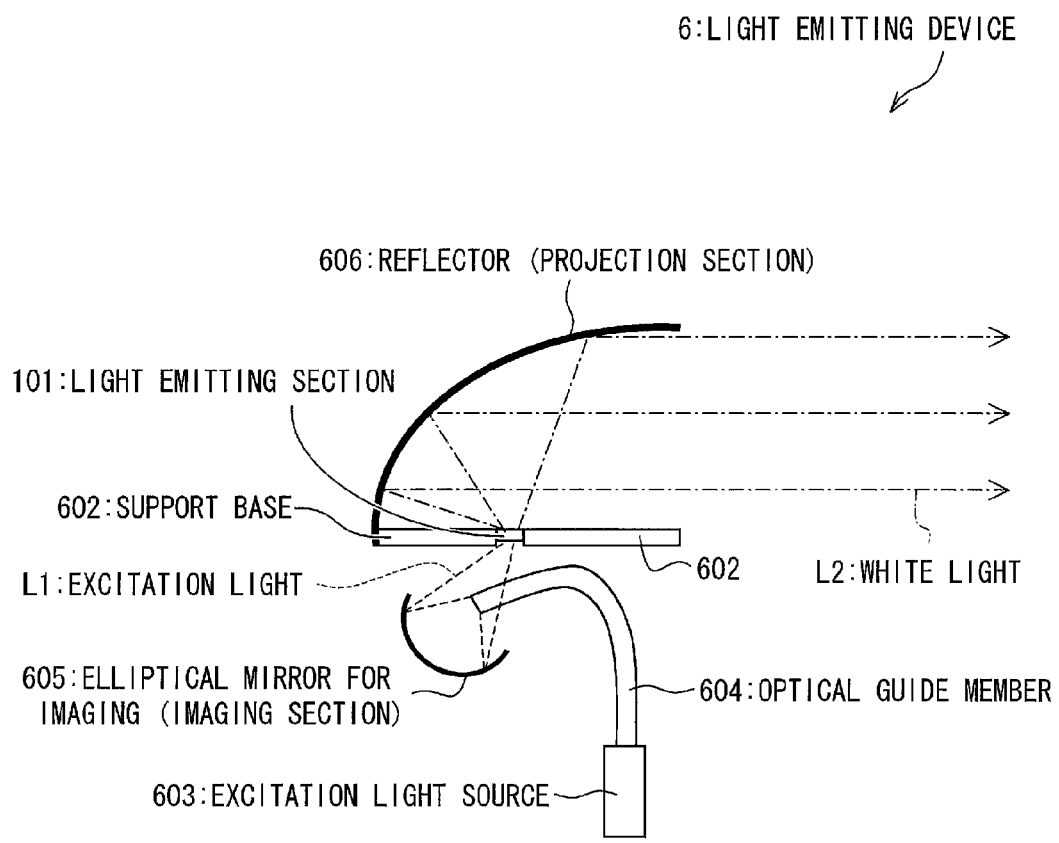
FIG. 10 is a sectional diagram of a light emitting device according to still another embodiment of the invention.

Another embodiment of the invention will be described based on FIG. 10 as follows. Note that, for convenience of description, the same reference signs are assigned to members having the same functions as those of the members described in the aforementioned embodiments, and description thereof will be omitted.

(Feature of Light Emitting Device 6 According to Present Embodiment)

The light emitting devices 1 to 5 of the aforementioned embodiments have a configuration in which the surface of the light emitting section 101 or the light emitting section 101', which the excitation light L1 enters, and the surface from which the white light L2 is output from the light emitting section 101 or the light emitting section 101' are the same. On the other hand, a light emitting device 6 of the present embodiment has a configuration in which a surface of the light emitting section 101, which the excitation light L1 enters, and a surface from which the white light L2 is output from the light emitting section 101 are surfaces opposite to each other.

The aforementioned difference is a first feature of the light emitting device 6 of the present embodiment compared to the light emitting devices 1 to 5 of the aforementioned embodiments.

(Configuration of Light Emitting Device 6)

The configuration of the light emitting device 6 according to the present embodiment will be described by using FIG. 10. FIG. 10 is a sectional diagram of the light emitting device 4. As illustrated in FIG. 10, the light emitting device 6 includes the light emitting section 101', a support base 602, an excitation light source 603, an optical guide member 604, an elliptical mirror for imaging (projection section) 605, and a reflector (projection section) 606.

The support base 602 supports the light emitting section 101. More specifically, the support base 602 is provided with, in a part thereof, a through hole having a size which matches a size of the light emitting section 101', and the light emitting section 101 is supported inside the through hole when the light emitting section 101 is arranged inside the through hole.

The excitation light source 603 is a semiconductor laser element which outputs the excitation light L1 having a wavelength of 450 nm and an output of 3 W.

Similarly to the optical fiber 304a of the aforementioned embodiment, the optical guide member 604 is a multimode optical fiber including an exit end surface whose cross sectional shape is a rectangle having a side a (refer to FIG. 5(a)). The optical guide member 604 guides the excitation light L1 output from the excitation light source 603 toward a reflective surface of the elliptical mirror for imaging 605. On an exit end surface of the optical guide member 604, a rectangular near field image having the side a is generated.

The elliptical mirror for imaging 605 is a mirror for imaging, which includes the reflective surface having a cross section in an elliptical shape. The elliptical mirror for imaging 605 reflects the excitation light L1 output from the exit end surface of the optical guide member 604 and forms the near field image of the exit end surface of the optical guide member 604 on the light emitting section 101'. At this time, the elliptical mirror for imaging 605 is to form an image of the side a of the near field image most sharply on the front surface of the light emitting section 101'.

When the excitation light L1 enters the light emitting section 101', a part of the excitation light L1 is converted into yellow light by a phosphor (YAG: Ce) included in the light emitting section 101'. The yellow light which is generated in this manner and the excitation light L1 which is not converted by the phosphor are mixed, resulting in the white light L2 being generated.

The reflector 606 is a mirror having a reflective surface with a part of a paraboloid of revolution as a base. The reflector 606 projects the white light L2 output from a rear surface side of the light emitting section 101' to an outside of the light emitting device 3. The reflector 606 is formed of, for example, metal.

In a projection pattern projected by the reflector 606, linear light-dark contrast is formed in the horizontal direction with a part of the projection pattern corresponding to a side a' of the light emitting section 101' as a boundary. Therefore, by using the light emitting device 6, it is realized to obtain projection particularly suitable for being used as a headlamp for passing.

[Summary of Configurations of Respective Embodiments]

Configurations which are particularly desirable in the configurations of the above-described embodiments will be described in (1) to (6) below.

(1) A light emitting device of the invention is suitable for a lamp for passing of a headlamp. This is because, by using the light emitting device of the invention, a pattern having linear and high light-dark contrast is able to be projected, and the linear light-dark contrast is suitable for forming a cutoff portion of the lamp for passing. Moreover, by controlling an irradiation region with respect to a light emitting section, a light distribution pattern is able to be changed as desired, thus making it possible to provide a headlamp of a variable light distribution type, as well. Such headlamp of a variable light distribution type is difficult to be realized by a lamp for a vehicle described in PTL 1.

(2) When comparing a configuration in which a surface of the light emitting section, which excitation light enters, and a surface from which white light is output from the light emitting section are the same and a configuration in which these surfaces are surfaces opposite to each other, desired is the former configuration which is able to form higher light-dark contrast on a front surface of the light emitting section.

(3) It is preferable that an optical guide member be an optical fiber which has high flexibility in arrangement. It is particularly preferable to be configured so that a plurality of optical fibers are used individually or integrated. In addition, it is also preferable that the optical guide member be a tapered type. In the case of this configuration, it is possible to cause excitation light output from a plurality of laser elements to enter the optical guide member.

(4) A shape of an exit end surface of the optical guide member only needs to be a shape having at least one side. However, in a case where the light emitting device is used as a headlamp (low beam), it is desirable to be a shape as illustrated in FIG. 3(a) (z-shape).

(5) It is preferable that a projection section have a configuration for projecting illumination light with a lens. This configuration is preferable from viewpoints of, for example, enabling the illumination light to be projected so that, compared to a configuration for projecting illumination light with a reflector, light-dark contrast at an end portion of the light emitting section is clearer and is more distant and, additionally, making the configuration of the light emitting device simple and compact.

(6) From a viewpoint of eye safety, a wavelength of excitation light L1 is preferably 405 nm. This is because, with this configuration, the excitation light L1 does not form white light which is projected outside and the white light is formed of only fluorescence, and thus it is possible to shield the excitation light L1 so as not to be projected outside. However, since the wavelength of the excitation light is not particularly limited, the excitation light of any wavelength may be used. Note that, a phosphor of the light emitting section only needs to emit light by receiving the excitation light, and is not limited by other conditions.

SUMMARY

A light emitting device (1 to 6) according to an aspect 1 of the invention includes: an excitation light source (103, 103', 303, 403, 503, 603) which outputs excitation light; a light emitting section (101, 101') which emits light by receiving the excitation light; an optical guide member (104, 204, 304, 404, 504, 604) which guides the excitation light from the excitation light source to the light emitting section; and an optical member (105, 505, 605) which forms, on a front surface of the light emitting section, an image of the excitation light guided by the optical guide member, in which the excitation light is radiated to the front surface obliquely, the optical guide member includes an optical guide section which has an exit end surface including at least one side, and the optical member forms an image of a linear edge portion, which corresponds to one of the at least one side, in the image of the excitation light.

With the aforementioned configuration, the exit end surface of the excitation light includes at least one side. An image of the at least one side is formed on the front surface of the light emitting section as the linear edge portion (image formation line). As a result thereof, the light emitting section is to emit light most sharply on the image formation line. In other words, light-dark contrast having the image formation line as a boundary becomes the highest in a light emitting pattern from the light emitting section. In addition, the image (near field image) of the excitation light guided by the optical guide member is projected in an image region, which is continuous with the image formation line, on the front surface of the light emitting section. As a result thereof, the light emitting section emits light also in the image region. Here, the light-dark contrast created on the light emitting section with the image formation line becomes higher as compared to a case where an image of the end side is not formed on the front surface of the light emitting section. Therefore, with the image formation line as the boundary, the light emitting section is to emit light with high light-dark contrast between the image region and a region opposite to the image region across the image formation line.

Accordingly, it is possible to obtain a light distribution with high light-dark contrast. The light distribution which is obtained in this manner is able to be used as, for example, a cutoff in a projection pattern of a low beam of a car. Note that, the optical guide section may be a multimode fiber, a hollow member having an inner surface which serves as a reflective surface, or an optical rod. For example, in a case where the optical guide section is the multimode fiber, a cross sectional shape of a core of the fiber is able to be set as a shape of the exit end surface.

A light emitting device (1 to 6) according to an aspect 2 of the invention may have a configuration in which the edge portion extends in a direction orthogonal to a direction of the excitation light entering the light emitting section (101, 101') in the aspect 1.

With the aforementioned configuration, an image of a linear side of the near field image of the excitation light is formed in the direction orthogonal to the direction of the excitation light entering the light emitting section. Therefore, an image of the linear side is formed on the front surface of the light emitting section as a sharp image formation line. A light emitting pattern from the light emitting section has high light-dark contrast having a side corresponding to the linear side as a boundary.

A light emitting device (1 to 3, 5) according to an aspect 3 of the invention may have a configuration in which the exit end surface has a plurality of sides in the aspect 1 or 2.

With the aforementioned configuration, the plurality of sides are included in the exit end surface. Here, the shape of the exit end surface may be a shape corresponding to a projection pattern of a low beam of an automobile. In this case, the light emitting device according to the invention is able to be used as a light emitting device for a headlamp (low beam) of an automobile.

A light emitting device (3 to 5) according to an aspect 4 of the invention may have a configuration in which the excitation light source (303, 403, 503) is composed of a plurality of excitation light source sections and an entrance end surface of the optical guide section receives excitation light output from the plurality of excitation light source sections.

With the aforementioned configuration, the excitation light output from the plurality of excitation light sources is received on the entrance end surface of the optical guide section. The excitation light from the plurality of excitation light sources, which has been received on the entrance end surface, is output from the same exit end surface. Therefore, after the excitation light output from the plurality of the excitation light sources is superposed with each other inside the optical guide section, the excitation light output from each of the excitation light sources is output from the exit end surface.

Accordingly, even when intensity of the excitation light output from each of the excitation light sources is low, it is possible to obtain the excitation light having high intensity by using the optical guide section.

A lighting device according to an aspect 5 of the invention includes: the light emitting device (1 to 6) of any of the aspects 1 to 4; and a projection section (106, 306, 406, 606) which projects light emitted from an image formation region of the linear edge portion in the light emitting section (101, 101') in a horizontal direction.

With the aforementioned configuration, by projecting, in a horizontal direction, an image of a light emitting pattern having high light-dark contrast, it is possible to project a projection pattern having high light-dark contrast in the horizontal direction. A lighting device which realizes such an effect is useful particularly in a case where it is necessary to obtain a projection pattern having clear light-dark contrast in the horizontal direction such as a cutoff line of a lamp for passing (or a low beam) of an automobile.

The invention is not limited to each of the embodiments described above, and may be modified in various manners within the scope shown in the claims and an embodiment achieved by appropriately combining technical means disclosed in each of different embodiments is also encompassed in the technical scope of the invention. Further, by combining the technical means disclosed in each of the embodiments, a new technical feature may be formed.

INDUSTRIAL APPLICABILITY

The invention is able to be utilized for a light emitting device, a headlamp of a vehicle, and a floodlight.

REFERENCE SIGNS LIST 1, 2, 3, 4, 5, 6 light emitting device (lighting device)
101, 101' light emitting section
103, 103', 303, 403, 503, 603 excitation light source
103a', 303a, 403a, 503a (excitation light source section)
104, 204, 304, 404, 504, 604 optical guide member
105 imaging lens (optical member)
505 imaging section (optical member)
605 elliptical mirror for imaging (optical member)
106 convex lens (projection section)
306, 406 projection section
606 reflector (projection section)

The invention claimed is:

1. A light emitting device, comprising:
an excitation light source which outputs excitation light;
a light emitting section which emits light by receiving the excitation light;
an optical guide member which guides the excitation light from the excitation light source to the light emitting section; and
an optical member which forms, on a front surface of the light emitting section, an image of the excitation light guided by the optical guide member, wherein
the excitation light is radiated to the front surface obliquely,
the optical guide member includes an optical guide section which has an exit end surface including at least one side, and
the optical member forms an image of a linear edge portion, which corresponds to one of the at least one side, in the image of the excitation light.

2. The light emitting device according to claim 1, wherein the edge portion extends in a direction orthogonal to a direction of the excitation light entering the light emitting section.

3. The light emitting device according to claim 1, wherein the exit end surface has a plurality of sides.

4. The light emitting device according to claim 1, wherein
the excitation light source is composed of a plurality of excitation light source sections and
an entrance end surface of the optical guide section receives excitation light output from the plurality of excitation light source sections.

5. A lighting device, comprising:
the light emitting device according to claim 1; and
a projection section which projects, in a horizontal direction, light emitted from an image formation region of the linear edge portion in the light emitting section.

* * * * *